US008607715B2

(12) United States Patent  
Catoni et al.

(10) Patent No.: US 8,607,715 B2  
(45) Date of Patent: Dec. 17, 2013

(54) STABILISATION OF OBJECTS

(75) Inventors: John Gerard Catoni, Dunsborough (AU); Toby William Heyring, Eagle Bay (AU); Christopher Brian Heyring, Eagle Bay (AU); Jonathan Ramsey Beames, Dunsborough (AU); Richard Monk, Busselton (AU)

(73) Assignee: No Rock Cafe Tables Pty Ltd, Eagle Bay (AU)

( * ) Notice: Subject to any disclaimer, the term of this patent is extended or adjusted under 35 U.S.C. 154(b) by 0 days.

(21) Appl. No.: 13/518,692

(22) PCT Filed: Dec. 23, 2010

(86) PCT No.: PCT/AU2010/001745  
§ 371 (c)(1),  
(2), (4) Date: Sep. 12, 2012

(87) PCT Pub. No.: WO2011/075793  
PCT Pub. Date: Jun. 30, 2011

(65) Prior Publication Data  
US 2013/0036950 A1 Feb. 14, 2013

(30) Foreign Application Priority Data

Dec. 24, 2009 (AU) .............................. 2009906295  
Aug. 12, 2010 (AU) .............................. 2010903612

(51) Int. Cl.  
*A47B 13/02* (2006.01)

(52) U.S. Cl.  
USPC ...................................... 108/150; 248/188.3

(58) Field of Classification Search  
USPC ................. 108/150; 248/188.3, 188.2, 188.8, 248/188.9  
See application file for complete search history.

(56) References Cited

U.S. PATENT DOCUMENTS 2,245,713 A * 6/1941 Redmond ................. 248/188.3  
2,787,087 A * 4/1957 Whitman ................... 248/188.3  
2,836,007 A * 5/1958 Dodds ........................ 248/188.3  
(Continued)

FOREIGN PATENT DOCUMENTS

FR    2607878 A1   6/1988  
FR    2 624 563 B2  6/1989  
FR    2 902 620 B3  12/2007  
FR    2902620 A1   12/2007  
WO    00/69312 A1  11/2000

OTHER PUBLICATIONS

Extended Search Report for EPO Application No. 10838433.0-1653/2515713 PCT/AU2010001745 Apr. 17. 2013.

(Continued)

*Primary Examiner* — Jose V Chen  
(74) *Attorney, Agent, or Firm* — Cascio & Zervas

(57) ABSTRACT

A stabilizing arrangement supports an object on four ground engaging devices on uneven ground has an interconnection mechanism, and three or four lever parts connected to the interconnection mechanism by respective pivots each with a pivot axis. The first and third pivot axes are at an angle of up to thirty degrees from parallel to each other and within thirty degrees of perpendicular to the second pivot axis. The first lever part includes a first engaging region engaging with the second engaging region of the second lever part. The third lever part includes a second engaging region engaging with the first engaging region of the second lever part. Rotation of the first lever part drives rotation of the second lever part which drives rotation of the third lever part opposite to the first lever part, allowing warp displacement of the four ground engaging devices.

29 Claims, 15 Drawing Sheets

(56) References Cited

U.S. PATENT DOCUMENTS

| | | | | |
|---|---|---|---|---|
| 3,117,392 A | * | 1/1964 | Junkunc | 248/188.3 |
| 3,185,423 A | * | 5/1965 | Jones, III | 248/188.3 |
| 3,278,147 A | * | 10/1966 | Olander | 248/188.3 |
| 3,814,362 A | * | 6/1974 | Ritchie | 248/188.3 |
| 3,827,663 A | * | 8/1974 | Hinman | 248/188.3 |
| 4,053,129 A | * | 10/1977 | Graff | 248/188.7 |
| 4,679,652 A | * | 7/1987 | Cervantes, Sr. | 248/188.3 |
| 5,690,303 A | | 11/1997 | Winters | |
| 5,913,498 A | * | 6/1999 | Brown et al. | 248/188.8 |
| 7,930,980 B2 | * | 4/2011 | Brooke | 108/153.1 |
| 2003/0230681 A1 | * | 12/2003 | Gwynneth | 248/188.3 |

OTHER PUBLICATIONS

English Translation of French Patent 2902620 Dec. 28, 2007 Publication date.

English Translation of French Patent 2607878 Jun. 10, 1988 Publication date.

English translation of French Patent 2 624 563 Publication Date: Jun. 16, 1989.

English translation of French Patent 2 902 620 Publication Date: Dec. 28, 2007.

* cited by examiner

STABILISATION OF OBJECTS

FIELD OF THE INVENTION

The present invention relates to the stabilisation of objects, such as freestanding furniture and appliances.

BACKGROUND TO THE INVENTION

Many objects such as items of furniture (ie tables, chairs and benches) and white goods are supported at at least four points of contact with the ground or floor (e.g. using ground engaging means such as legs, feet or wheels). These objects are used in a wide range of situations and in many cases the surface on which the object is stood is uneven or not a perfectly flat plane. To prevent, for example, furniture from rocking on an uneven surface it is common for small tables or stools to use three legs since three points are sufficient to define a linear plane and therefore provide location of the object without rocking. However, there are many reasons why three legs are undesirable on many objects, particularly those having a quadrilateral shape in plan view such as square or rectangular topped tables where four legs are generally preferred, located towards each corner, with more than four legs occasionally being desired or even required for larger tables. The use of four or more legs of equal length, each rigidly attached to and supporting a flat table top restricts the feet of the table to lie in a flat plane, so they are unable to all contact the ground simultaneously when the surface is uneven. This causes the table to be unstable and rock, which is most noticeable in four-legged tables with small table tops.

There are numerous applications requiring a support mechanism that is uncomplicated and robust, but can have four or more legs which adapt to uneven surfaces to provide stability.

BRIEF DESCRIPTION OF THE PRIOR ART

In U.S. Pat. No. 3,814,362, a table is shown having four L-shaped legs with the vertical portion of each leg located towards the centre of the table, two adjacent legs are fixed to each other and the table top. The other pair of adjacent legs are fixed to each other and pivotally connected to the lower end of the vertical portion of the fixed pair of legs such that relative rotation about the pivot provides adjustment of the four feet to uneven surfaces. The relative rotation is permitted or locked by additional mechanisms. However, the relative rotation of the pairs of legs can provide a misaligned or unattractive look to the table and user intervention is required to operate the additional locking mechanisms.

Australian Patent Number 690688 shows a four-legged table having a single central support column. Two members of L- or V-shape in plan view each include two adjacent legs and a vertically extending portion, ie three mutually perpendicular beams. Each member is pivoted to the table stem or column support by a horizontal pin and a control link member is pivotally mounted on a central vertical pin in or formed at the column, the control link member being pivotally connected to both L- or V-shaped members such that they rotate in opposite directions to maintain contact with the floor. The horizontal pin of each member and the control link are connected to opposite ends of the vertically extending portion to transfer the rotation of a member into a horizontal motion suitable to drive or be driven by the control link. However, this requires the mechanism to have significant height, limiting its application to uses where a central stem or support column of at least similarly significant height is provided. Also the L- or V-shaped members are not compatible with flat pack shipping.

French Publication Numbers 2 902 619 and 2 902 620 show mechanisms to permit vertical displacement of the four corner legs of a square or rectangular table. The arrangements disclosed maintain the angle of each leg perpendicular to the table top (which is very good for aesthetics) even when the legs have displaced to contact a very uneven surface. However, the linkages used involve an excessive quantity of individual links and joints making them complex and either heavy or fragile.

Canadian Patent Application Number 2,216,869 shows a flexible base for rolling chairs and workstools. Each castor is mounted at the lower end of a T-shaped arm 14, the arm 14 being able to rotatably fixed to the base about axis 24 (along the top bar of the T). Additional T-shaped bridge elements 26 are utilised which can pivot relative to the base about axis 34 (along the vertical bar of the T), the ends of the top bar engaging the T-shaped arms 14 of adjacent castors. Thus the mechanism permits vertical displacement of adjacent castors in opposing vertical directions to maintain contact with uneven surfaces, thereby preventing rocking and providing stability. However, the arrangement is complex having a large number of parts and a large number of joints.

It is therefore a preferred object of the present invention to provide a support mechanism having four or more legs that can adapt to uneven surfaces utilising an uncomplicated mechanism.

It is a preferred object of the present invention that the mechanism self adjust to the uneven surface without requiring operator intervention.

It is an optional object of the present invention to provide a travel stop to limit excess articulation of the mechanism without requiring operator intervention.

It is an optional object of the present invention that the interconnecting portion of the mechanism, rather than any vertically extending portions of the legs, is provided within a virtual or conceptual box having sides in plan view of significantly greater length than the height of the box.

SUMMARY OF THE INVENTION

With this in view, according to one aspect of the present invention there is provided a stabilising arrangement to support an object above four ground engaging means, the arrangement including an interconnection means interconnecting at least three lever parts including a first lever part, a second lever part and a third lever part, each connected to the interconnection means by a respective pivot having a respective pivot axis, each ground engaging means being attached to or integral with one of said at least three lever parts where at least one ground engaging means is connected to the first lever part and at least one ground engaging means is connected to the third lever part, the first pivot axis and the third pivot axis being at an angle of up to thirty degrees of parallel to each other, and within thirty degrees of perpendicular to the second pivot axis, the second lever part including first and second engaging regions, the first engaging region being located on the opposite side of the second pivot axis to the second engaging region in plan view, the first lever part including a first engaging region, in use engaged with the second engaging region of the second lever part, the third lever part including a second engaging region, in use engaged with the first engaging region of the second lever part, such that rotation of the first lever part drives a rotation of the second lever part which drives rotation of the third lever part in a substantially opposite direction to the first lever part to permit a warp displacement of the four ground engaging means, the stabilising arrangement thereby providing support of the object on uneven ground.

The first and third pivot axes may be substantially parallel to each other and substantially perpendicular to the second pivot axis.

To provide the mechanism within an envelope of minimal or constrained vertical height (during shipping and/or in operation), all the pivot axes may lie in a substantially horizontal plane and the engaging regions maybe located in that same horizontal plane, or offset vertically from said horizontal plane by a minimal distance such as the depth of a beam member of the mechanism. To that end, one or more of said at least three lever parts may have the or each engaging region at a greater horizontal distance than vertical distance from the respective pivot axis. So, for one or more of said at least three lever parts, the horizontal spacing of the or each said engaging region from the respective pivot axis may be greater than the vertical spacing of the or each said engaging region from the respective pivot axis.

The first lever part may include two ground engaging means and the third lever part may include two ground engaging means. In plan view, the first lever part may include a ground engaging means located on an opposite side of the first pivot axis to the first engaging region of the first lever part, and a ground engaging means located on the same side of the first pivot axis as the first engaging region of the first lever part; and also in plan view, the third lever part may include a ground engaging means located on an opposite side of the third pivot axis to the second engaging region of the third lever part, and a ground engaging means located on the same side of the third pivot axis as the second engaging region of the third lever part.

Alternatively or additionally, the stabilising arrangement may include a fourth lever part connected to the interconnection means by a fourth pivot having a fourth pivot axis, the fourth pivot axis being within thirty degrees of perpendicular to the first and third pivot axes, the fourth lever part including first and second engaging regions, the first engaging region being located on the opposite side of the fourth pivot axis to the second engaging region in plan view, the first lever part including a second engaging region located on the opposite side of the first pivot axis to the first engaging region in plan view, the third lever part including a first engaging region located on the opposite side of the third pivot axis to the second engaging region in plan view, the first engaging region of the fourth lever part in use being engaged with the second engaging region of the first lever part, and the second engaging region of the fourth lever part in use being engaged with the first engaging region of the third lever part.

Alternatively, the at least one ground engaging means connected to the first lever part may be a single ground engaging means, the at least one ground engaging means connected to the third lever part may be a single ground engaging means, and at least one ground engaging means may be connected to the second lever part. In this case, the ground engaging means of the first lever part may be located on an opposite side of the first pivot axis to the first engaging region of the first lever part in plan view; and the ground engaging means of the third lever part may be located on an opposite side of the third pivot axis to the second engaging region of the third lever part in plan view. This ensures that, for the first lever part for example, any force on the first engaging region of the first lever part reacts at least a portion of the moment (about the first pivot) axis produced by any force on the ground engaging means of the first lever part, so these two forces always act in substantially the same direction, such that while the object is supported via the ground engaging means, the engaging regions of the lever parts are continuously loaded. Therefore in use (ie while the stabilising arrangement is supporting the object) the loads in the engaging regions do not reverse or vary through zero, which provides greater stability by reducing or eliminating free or uncontrolled motion even when tolerances in the arrangement are poor or loose.

Additionally or alternatively, the first lever part may have a single ground engaging means, the third lever part may have a single ground engaging means and the second lever part may have two ground engaging means. Again, the engaging regions of the lever parts will be continuously loaded in use.

Alternatively, the stabilising arrangement may further include a fourth lever part connected to the interconnection means by a fourth pivot having a fourth pivot axis, the fourth pivot axis being within thirty degrees of perpendicular to the first and third pivot axes, the fourth lever part including first and second engaging regions, the first engaging region being located on the opposite side of the fourth pivot axis to the second engaging region in plan view, the first lever part including a second engaging region located on the opposite side of the first pivot axis to the first engaging region in plan view, the third lever part including a first engaging region located on the opposite side of the third pivot axis to the second engaging region in plan view, the first engaging region of the fourth lever part in use being engaged with the second engaging region of the first lever part, the second engaging region of the fourth lever part in use being engaged with the first engaging region of the third lever part, the second and fourth lever parts may each include a respective single ground engaging means.

The respective ground engaging means of each lever part may be located on the same side of the respective pivot axis as the respective first engaging region. Again the engaging regions of the lever parts will be continuously loaded in use.

At least one of said ground engaging means may include a ground engaging portion having at least two ground engaging points.

The ground engaging portion may be articulated to the respective lever part to enable distribution of load between at least two ground engaging points of the ground engaging portion.

Alternatively, the invention may provide a support mechanism for supporting an object, the support mechanism including at least four legs and an interconnection means connecting the at least four legs. Each leg may have at least a beam portion having a first end and a second end. The at least four legs may be arranged around the interconnection means such that the first end of the beam portion of each leg is adjacent the second end of the beam portion of an adjacent leg e.g. forming a polygon in plan view. Each leg may be pivotally connected to the interconnection means by a joint located between the first and second ends of the respective beam portion. In use, the first end of the beam portion of each leg engages with the second end of the beam portion of the adjacent leg to transmit a support reaction force therebetween such that, when the beam portion of one leg is rotatably displaced causing the first end of that beam portion to move in an upwards direction and the second end of that beam portion to move in a downwards direction, the adjacent legs engaging respectively with the first and second ends of that beam portion are both caused to rotatably displace such that the first end of the beam of one adjacent leg moves in a downwards direction and the second end of the other adjacent leg moves in an upwards direction.

This mechanism is thereby able to conform to uneven surfaces. If only four legs are provided the load on each leg is substantially unaffected by the magnitude of warp of the uneven surface.

Each leg may further include an actuation portion [could be just "actuator"] extending from one end of the beam portion and may include a ground engaging portion or ground engaging means towards a distal end of the actuation portion.

The beam portion of each leg may further include a protrusion extending from the first end of the beam portion e.g. protruding laterally or longitudinally, the protrusion engaging with the second end of the beam portion of the adjacent leg such that a support reaction force is transmitted therebetween.

The actuation portion of each leg may extend from the second end of the beam portion, or alternatively the actuation portion of each leg may extend from the first end of the beam portion.

The actuation portion of each leg may be substantially horizontal in use. In this case, the beam portions of the legs will be close to the ground giving a pedestal type table. Alternatively, the actuation portion of each leg may include a substantially vertical portion, for example if used under a square table it could provide a typical leg at each corner.

The interconnection means may be connected directly or indirectly to the object to be supported. The interconnection means may include a base portion to which the beam portions of the legs are pivotally connected and/or may include a vertical stem or support member.

The interconnection means may be connected to a table top to provide support therefore, i.e. the object being supported is a table top.

Alternatively, when the interconnection means are directly connected to the object to be supported, the interconnection means may form part of or be attached the object to be supported, for example where there are four legs provided, there may be four corresponding tabs or protrusions extending down from (or even moulded into) the underside of the object, the tabs being the interconnection means to which the beam portions are connected. In this case, each tab may be aligned with the beam portion of a leg and form, for example, at least part of each side of a quadrilateral. If the object being supported is a table top, the actuation portions of each leg may include a respective substantially vertical portion.

A travel limit may be provided and this may be fixed in operation relative to the interconnection means to provide a physical limit to the rotation of each leg about its pivot axis to thereby limit an articulation or warp displacement of the legs.

Alternatively, the invention may provide a table adaptable to uneven surfaces, the table including a table top and at least four legs, the at least four legs being connected to the table top by an interconnection means. Each of said at least four legs may include a substantially horizontal beam portion, a ground engaging portion and an actuating portion connecting the ground engaging portion to the beam portion. The beam portion of each leg includes a first end and a second end, the first end of each leg beam portion acting on the second end of the adjacent leg beam portion, each leg being connected to the interconnection means at a respective pivot having a pivot axis located at a point between the first and second ends of the respective beam portion.

Each pivot axis may be located midway between the first and second ends of the respective beam portion. Each pivot axis may be substantially horizontal in use, although the pivot axis may be inclined, such as up to 15 degrees, above or below horizontal (or even more although increasing pivot axis inclination increases the relative motion between the adjoining ends of adjacent leg beam portions).

Each leg may include a beam portion major axis between the first and second ends of the beam portion. The pivot axis of each leg may preferably be substantially perpendicular to the beam portion major axis in use, although a deviation up to 15 degrees from perpendicular may be used (or even more, although increasing the deviation from perpendicular reduces the efficiency of the mechanism).

If the table includes four legs, the legs may be arranged such that their beam portions form a quadrilateral shape in plan view.

If the table includes six legs the legs may be arranged such that their beam portions form a hexagonal shape in plan view.

As four legs can conform to any uneven or warped surface, when the table includes four legs the interconnection means may include a substantially horizontal base portion providing location of the pivot axis of each leg. In that case, if the quadrilateral shape formed by the beam portions is a square or rectangle, the pivot axis of two opposite legs may be aligned and the pivot axis of adjacent legs will be perpendicular thereto, such that the base portion effectively provides two perpendicular, substantially horizontal axes. The base portion of the interconnection means may be formed in the shape of a cross. Alternatively, the base portion of the interconnection means may be square or rectangular in plan view.

The table may include a travel limit fixed in operation relative to the interconnection means and providing a physical limit to the rotation of each leg about its pivot axis to thereby limit an articulation or warp displacement of the legs.

The interconnection means may include a substantially vertical stem portion which may connect to the table top or to a folding mechanism in the case of a folding table top.

DESCRIPTION OF PREFERRED EMBODIMENTS

Figure 1:
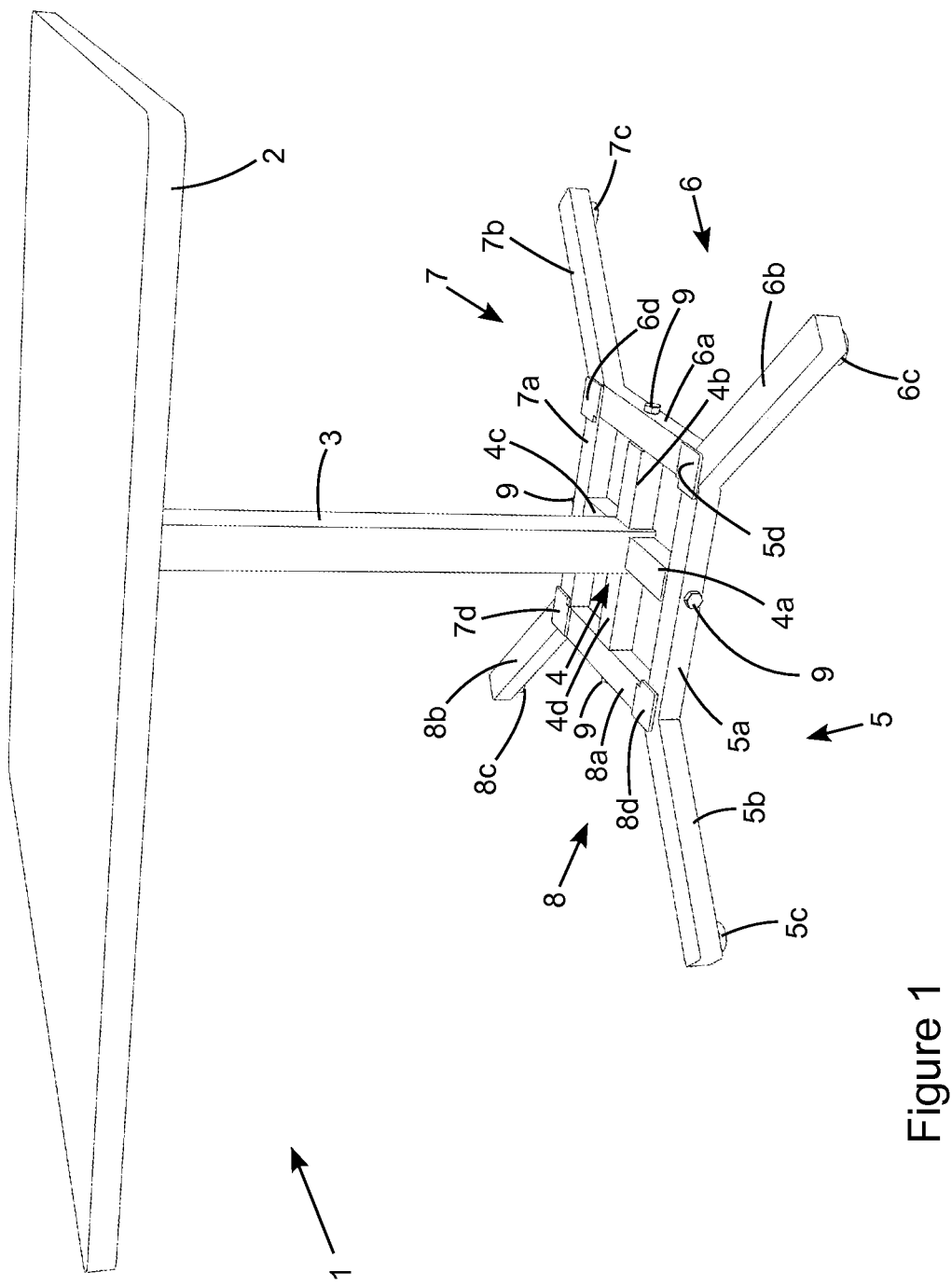
FIG. 1 is a perspective view of a first possible embodiment of the present invention.
Figure 2:
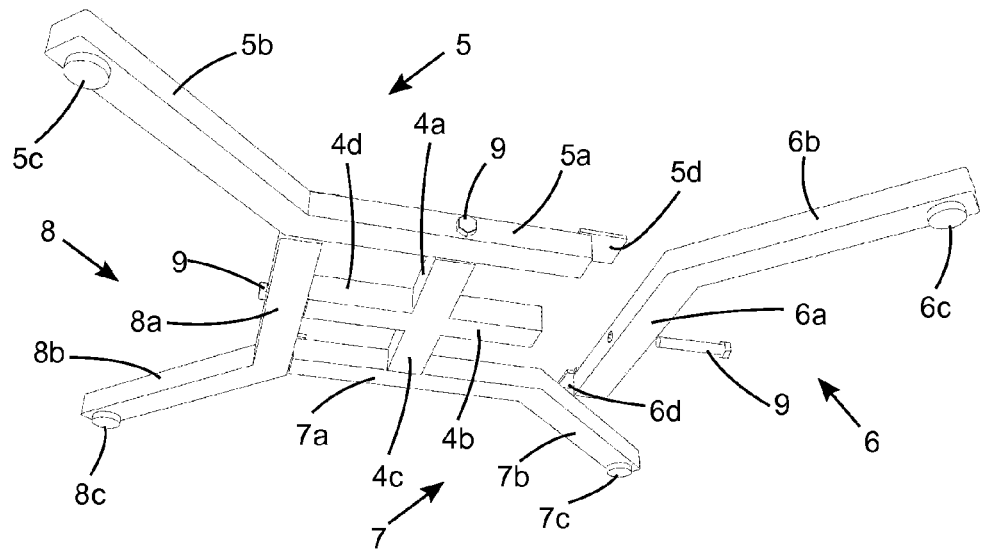
FIG. 2 is a partial exploded view under the base of the first embodiment.

Referring initially to FIG. 1 there is shown an object 1 being supported on four ground engaging means or feet, 5c, 6c, 7c, 8c. The object is, in this example, a table having a table top 2 supported by a vertical member or stem 3. The lower end of the stem is attached to a base portion 4 to which four lever parts or table legs 5, 6, 7 and 8 are connected. The stem and base portion thereby interconnect all of the legs and the table top. FIG. 2 also shows the base portion and legs, but from the underside with the stem and table top omitted for clarity and with one leg exploded away from the base.

Each table leg includes a beam portion 5a, 6a, 7a or 8a, in the middle of which is a bolt 9 pivotally connecting the leg to the base portion 4 such that each leg is able to rotate about its own pivot axis. The base portion 4 shown is made up of four members 4a, 4b, 4c, and 4d which in this case are substantially horizontal and are arranged in a cross-pattern since they provide location of the pivot axes of the four legs 5, 6, 7 and 8, the beam portions (5a, 6a, 7a, 8a) of which are themselves arranged in a square layout. If the layout of the four legs was rectangular, the opposing members 4a and 4c would still be aligned but would be a different length to the opposing members 4b and 4c which would still be aligned to each other.

One end of the beam portion (5a, 6a, 7a or 8a) of each table leg adjoins an actuating portion (5b, 6b, 7b, or 8b respectively) of the table leg, which extends from the end of the beam portion to the point where the leg contacts the ground or other surface. A foot (5c, 6c, 7c or 8c) is shown at the end of each leg. Each foot can be integral with the leg, being as simple as a flat or preferably slightly convex surface to contact the ground, or it can be a separately attached item to allow the foot to be suited to the application (for example a different ground contacting material such as rubber or felt can be bonded to the leg or attached as a replaceable part).

At the opposite end of the beam portion (5a, 6a, 7a or 8a) is a protrusion or tab 5d, 6d, 7d or 8d which rests on the top surface of the adjacent leg (6, 7, 8 or 5 respectively).

If the table is on a flat level surface, the beam portions (5a, 6a, 7a and 8a) of the legs are substantially horizontal (or at least a line between the contact point to each adjacent leg is inclined at less than 30 degrees on a flat level surface). The vertical support force acting upwards at the foot 5c of leg 5 for example, creates a moment about the pivot axis of the leg, the pivot axis being along the major axis of bolt 9 through the beam portion 5a of that leg. This moment is substantially reacted by a couple formed (at either end of the beam portion 5a) by an upwards force on the tab 5d from the vertical force in the adjacent leg 6 and by a downwards force acting on the leg 5 from the tab 8d of the other adjacent leg 8. The vertical support force from the foot 5c is substantially reacted by a vertical force acting downwards from the bolt 9 onto the centre of the beam portion 5a of the leg 5. The angling of the actuating portion 5b of the leg from the beam portion 5a generates an offset between the foot 5c and the line of the major axis of the beam portion 5a providing a moment resulting in a torsion force in part of the beam portion 5a between the actuating portion and the bolt position, the moment being reacted by forces from the bolt 9 and the base portion member 4a.

Figure 3:
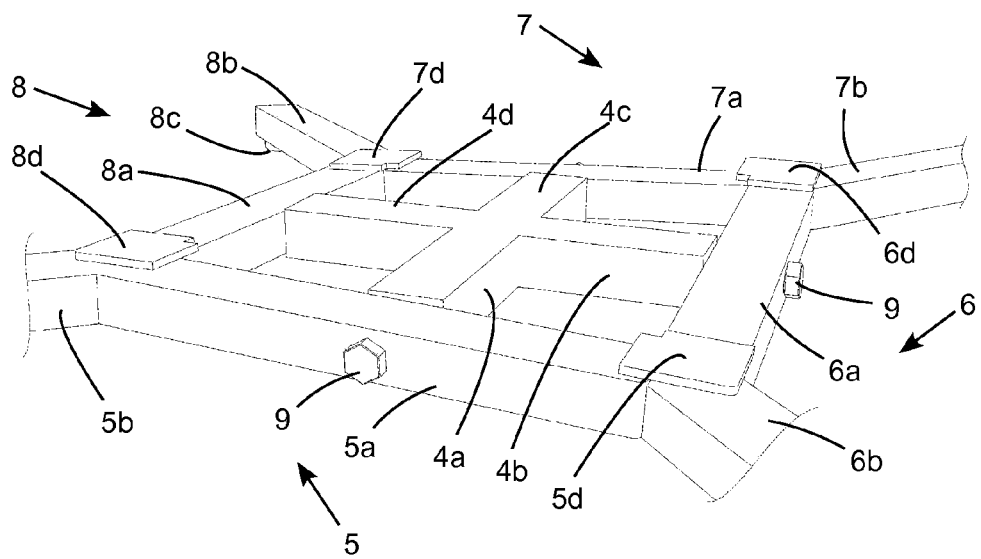
FIG. 3 is a partial view of the base of the first embodiment of the present invention when the table is adjusted to uneven ground.

However, if the feet (5c, 6c, 7c, 8c) do not all lie in a common linear plane (ie if one foot is sitting on an obstacle such as a brick that sits slightly proud of the pavement for example) then the legs inherently adjust or articulate to conform to the warped (non-linear plane or uneven) surface whilst still transferring loads as described for the flat level surface situation. For example, if foot 5c was sitting above the plane described by the other three feet, the leg 5 would rotate clockwise relative to the base portion 4 as seen in FIG. 3. This causes tab 5d to push on leg 6 rotating it anticlockwise pushing foot 6c downwards and causes leg 5 to push tab 8d upwards, rotating leg 8 to push foot 8c downwards. Similarly 6d and leg 8 interact with leg 7 and tab 7d to rotate leg 7 and push foot 7c upwards. The resultant displacement of the feet 5c, 6c, 7c and 8c relative to the base portion 4 is that feet 5c and 7c are displaced upwards and feet 6c and 8c are displaced downwards with respect to the base 4. Opposite feet move in a common vertical direction. Adjacent feet move in opposite vertical directions.

The base 4 and therefore the table top 2 lie parallel to the linear plane which is the average through the four points of contact of the feet with the ground. All feet are in contact with the ground. All feet are load bearing, carrying substantially the same load as the four feet of the same size and load of table sitting on the average linear plane Although the stem portion or vertical member 3 and the table top 2 have again been omitted for clarity in FIG. 3, it should be noted that the vertical member and base portion may be one rigid piece, or separate pieces to allow flat packing for shipment, being rigidly connected together on assembly.

Figure 4:
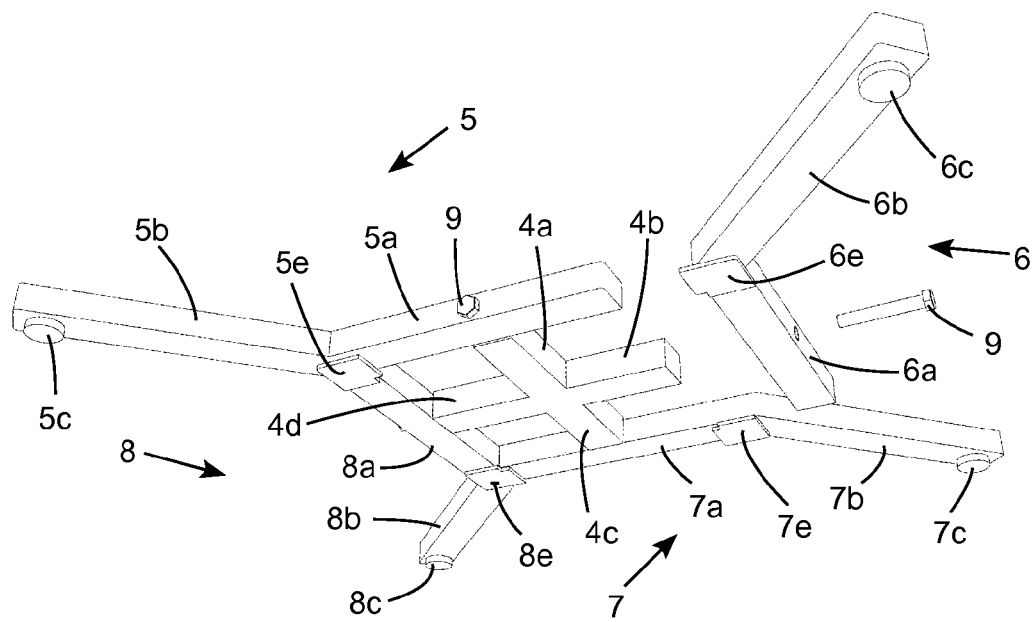
FIG. 4 is partial exploded view similar to FIG. 2, showing a modification to the first embodiment.

FIG. 4 shows a modification to the arrangement shown in FIGS. 1 to 3, in which the protrusions or tabs have been relocated to the underside of each leg at the join between the beam portion and the actuating portion of the leg, contacting the underside of the free end of the beam portion of the adjacent leg. The operation of the mechanism is similar to the operation of the mechanism from FIGS. 1 to 3 as described above, with the forces and moments being similar. The use of an actuating portion extending from one end of the beam portion of each leg ensures that the direction of each force and moment is fixed in operation and only moving the actuating portion to the opposite end of each beam portion will reverse the direction of the couple forces (ie those at either end of the beam portion). The forces at either end of the beam portion 5a for example are of similar magnitude and direction to the previous example, but the actual surfaces used as contact points to transfer the forces between the bodies are different. The upwards force on the free end of the beam portion 5a is now applied to the underside of the beam by the tab 6e which is fixed to the underside of the adjacent leg 6 and by a downwards force acting on the tab 5e of the leg 5 from the free end of the beam portion 8a of the other adjacent leg 8.

Figure 5:
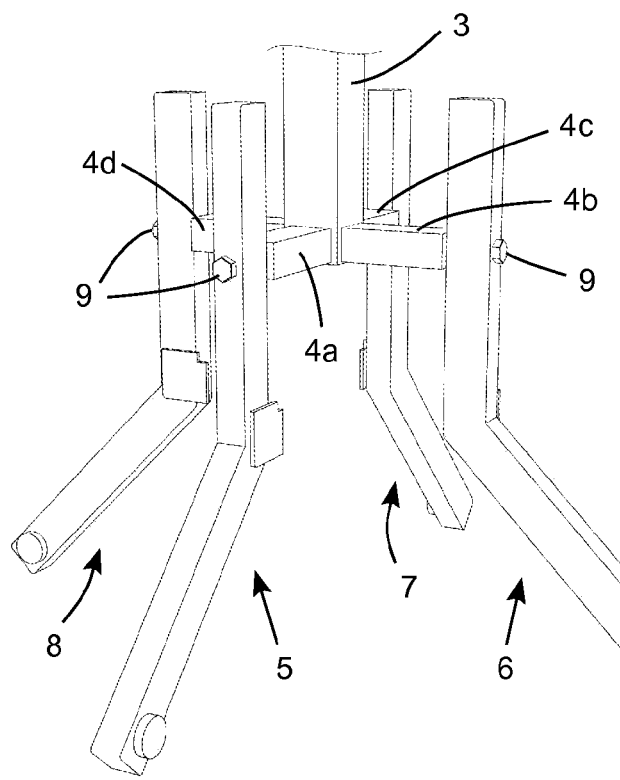
FIG. 5 is a partial view of the mechanism from FIG. 4 in a folded position.

If the legs are not prevented from rotating approximately ninety degrees from the level position, then as the table is lifted off the ground, the legs can rotate to a folded position as shown in FIG. 5. If the legs can be locked in the folded position and the table top folded as is well known in the art, the table can be stored using a very low footprint area on the floor.

It should be noted that both the tab positions 5d, 6d, 7d, and 8d from FIGS. 1 to 3 and the tab positions 5e, 6e, 7e, and 8e in FIGS. 4 and 5 can be used together and the legs of the mechanism can still rotate to a folded position.

Alternatively, an upper and lower tab can be provided at the free end of each beam portion forming a C-shaped yoke around the opposite end of the beam portion of the adjacent leg. Although the sense of the couple on each beam portion is fixed in operation, the additional unloaded tabs can be used to restrict the magnitude of rotational motion possible for each leg to limit the articulation of the mechanism and prevent it folding unintentionally (ie when lifting the table to move location).

Similarly, a further alternative is to use an upper and lower tab at the end of the beam portion adjoining the actuating portion of the leg, the upper and lower tabs forming a C-shaped yoke around the free end of the beam portion of the adjacent leg.

Figure 6:
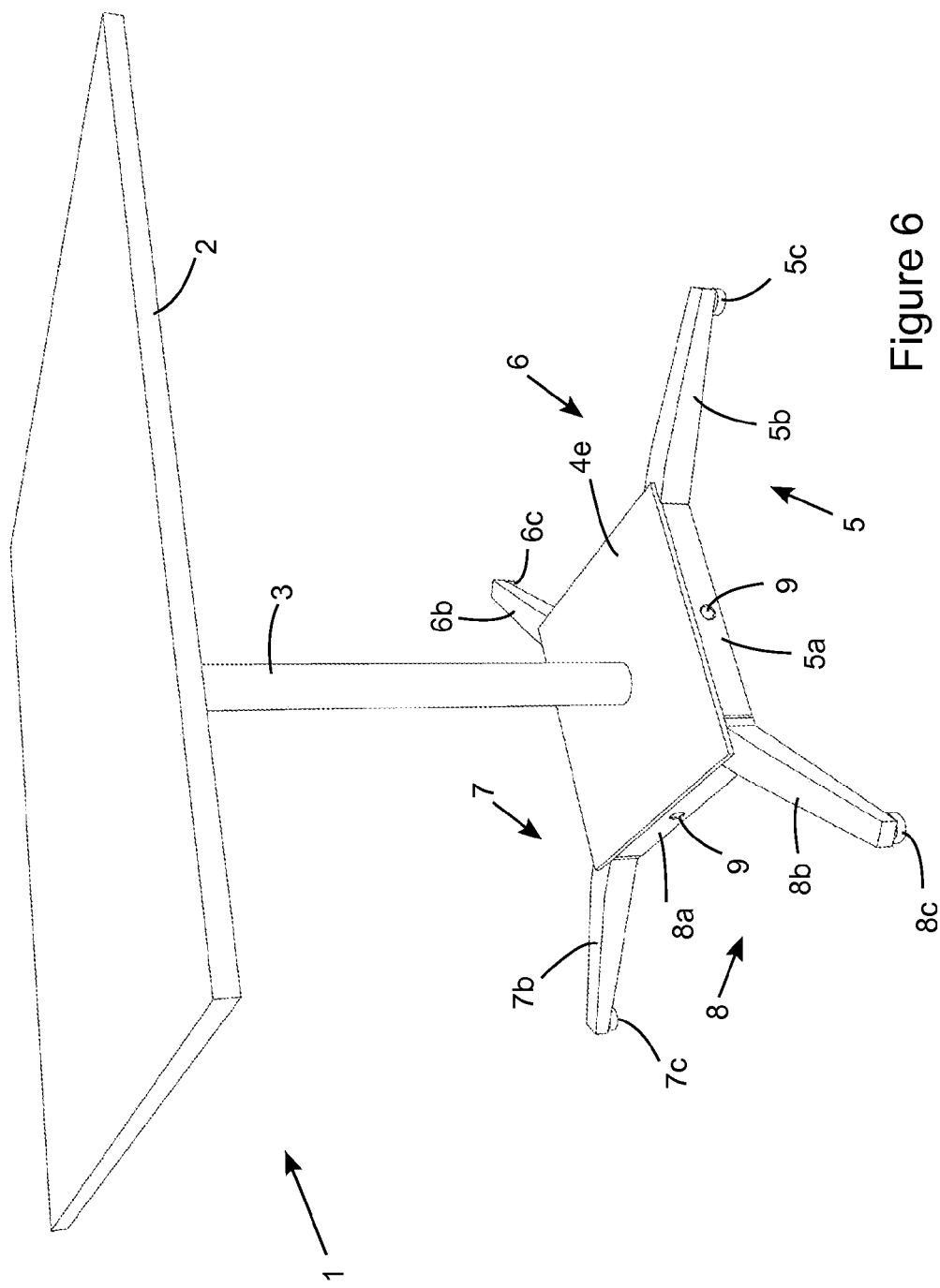
FIG. 6 is a perspective view of a second possible embodiment of the present invention.
Figure 7:
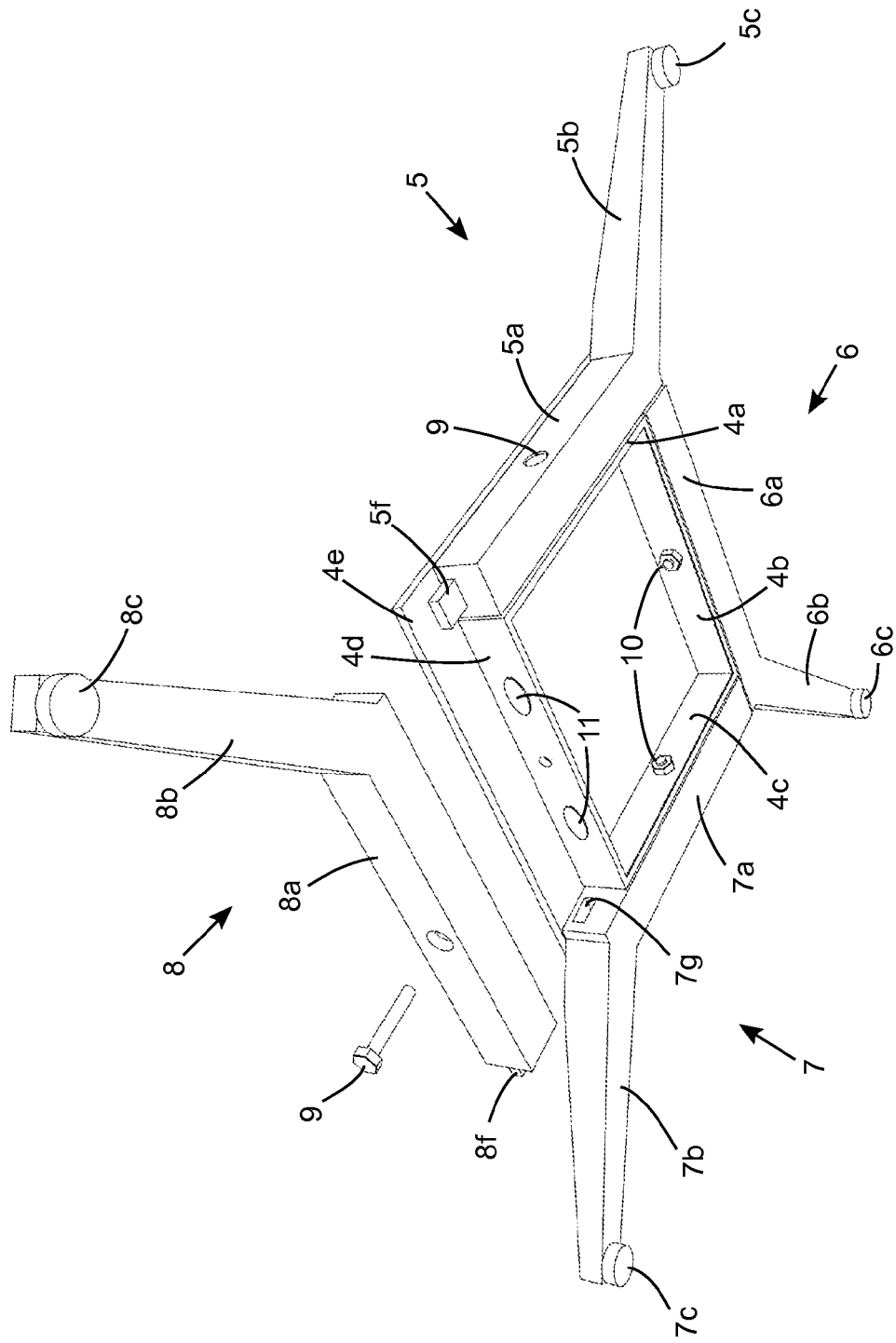
FIG. 7 is a partial exploded view under the base of the second embodiment.
Figure 8:
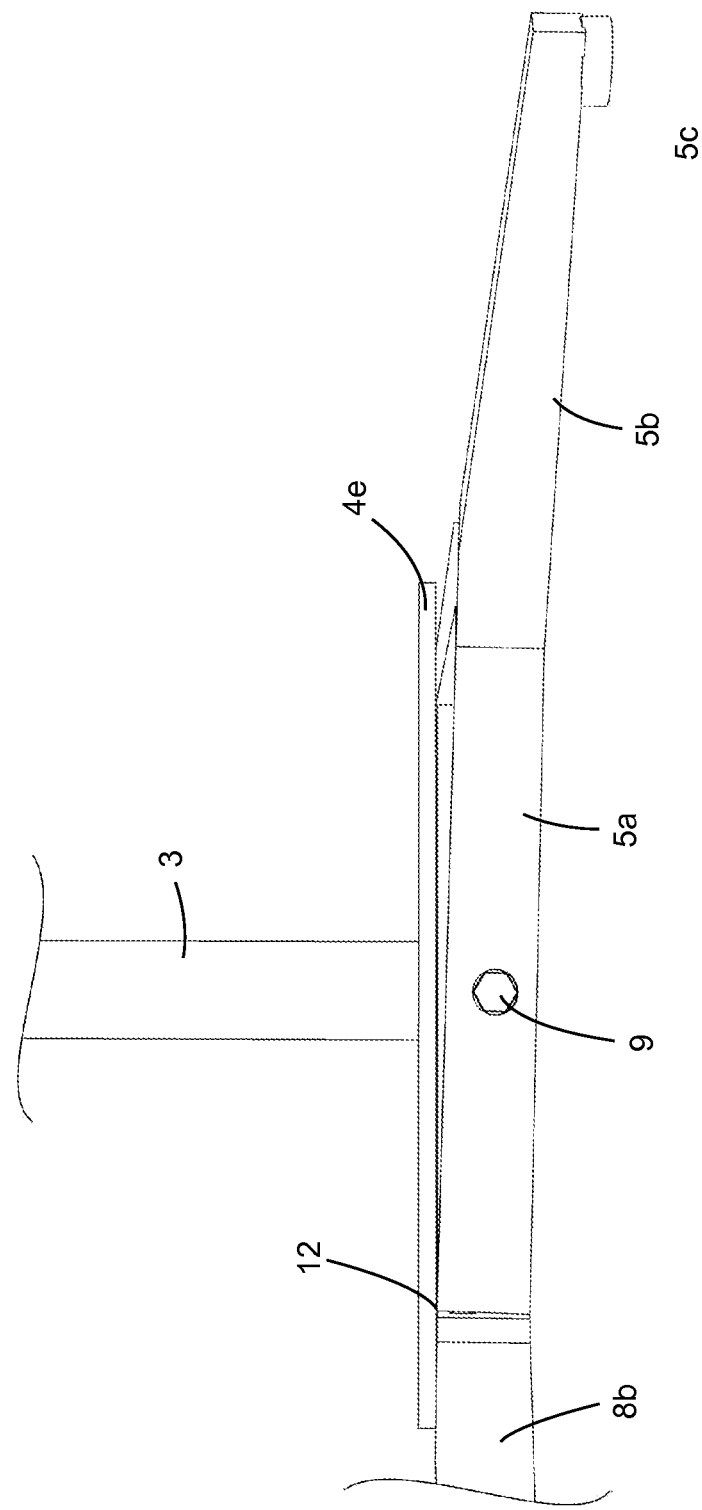
FIG. 8 is a partial view of the base of the second embodiment of the present invention when the table is adjusted to uneven ground.

FIGS. 6, 7 and 8 show a similar table incorporating alternative arrangements of the present invention. FIG. 6 shows the alternative arrangement in a view similar to that of FIG. 1 with equivalent components being given like reference numerals.

The table 1 has a table top 2 supported by a stem or vertical member 3. The lower end of the vertical member 3 is attached to the horizontal base portion 4, but the base portion now incorporates a top cover 4e which largely hides the mechanism from above as seen in FIG. 6. FIG. 7 shows the base portion and legs with one leg exploded away from the base and with the stem and table top omitted for clarity.

The actuating portion (5b, 6b, 7b and 8b) of each leg extends from the opposite end of the beam portion (5a, 6a, 7a, and 8a) to that in FIGS. 1 to 5, so while the operation remains the same, the sense of the couple (the substantially vertical forces at either end of the beam member) of each leg will be reversed.

Similarly the protrusion at the end of the beam portion is shown at the opposite end to the actuating portion as in FIGS. 1 to 3. In FIG. 7, the protrusion 5f at the end of the beam portion 5a of leg 5 is neither above nor below the beam portion 5a, but within its cross-section so that it is concealed once assembled. The protrusion 5f in this case is received within a blind hole within one end of the beam portion 8a (being the end of the beam portion 8a adjoining the actuating portion 8b). Although this blind hole is not visible in FIG. 7, the similar protrusion 8f is received within a similar blind hole 7g. The operation of the legs is equivalent to that in FIGS. 1 to 3.

The base portion 4 is also modified from that in FIGS. 1 to 3, but functionally equivalent. A vertical wall (4a, 4b, 4c or 4d) of material is provided for each leg (5, 6, 7 or 8). This solid, hollow or open box design can for example be fabricated or cast. Each bolt 9 pivotally connecting the respective leg to the base is aligned to a similar axis (perpendicular to the beam portion of the respective leg) as that in FIGS. 1 to 3. For example, the bolt 9 connecting leg 8 to the base is received in the wall 4d. The bolt can be threaded into the wall and/or a nut or locknut used such as those shown at 10 for legs 6 and 7. Bearings or other wear plates 11 are attached to the wall 4d to work against the inward facing surface of beam portion 8a (or conversely can be attached to the beam portion 8a to work against the surface of the wall 4d). The use of locknuts can allow for occasional maintenance adjustment of the mechanism to compensate for wear over time with heavy usage, or for example in corrosive or particularly abrasive environments.

The top cover 4e extends over the top surface of the beam portion of each of the legs not only to provide a cleaner looking design, but also to provide an important travel limiting mechanism. FIG. 8 is a side view of the lower portion of the table with the legs adjusted to maintain contact with an uneven ground surface. As described in relation to FIG. 3, this adjustment to conform to a warped surface is an inherent feature of the mechanism and as such happens automatically and immediately without any adjustment action by a user. However, such negligible warp stiffness mechanisms can benefit from travel stops to prevent unnecessarily large articulation or warp motions of the legs which can for example allow the mechanism to undesirably have legs rotate out of sequence or apply excessive bending loads to the protrusions inside the blind holes unless excessive vertical free play is provided in the holes. Limiting the travel of the mechanism in operation also prevents the legs from falling towards a folded position when the table is lifted to move position, such as when café tables are rearranged to suit group numbers, shelter from the elements or enjoy the sun.

As can be seen in FIG. 8, to achieve this travel limit, the height of the lower face of the top cover 4e can be chosen to limit the rotation of the leg 5 to a desired maximum deflection. At that desired maximum deflection, the top surface of the beam portion 5a of the leg contacts the underside of the top cover 4e as indicated at 12 providing a physical travel limit or stop.

The top cover 4e can be adjustable in height either to allow adjustment of the magnitude of articulation motion permitted by the legs 5-8, or to permit large motions of the legs so they can move to a folded position similar to that shown in FIG. 5. For example, the top cover 4e can have a first lockable position at the base of the stem 3 to provide the travel limit stop function discussed above. A second lockable position can be provided such that the top cover 4e can be used to locate and hold the legs in the folded position. The top cover can be provided with the freedom to slide above the second lockable position to facilitate motion of the legs between the operating position and the folded position.

As the top cover 4e functions as a travel stop to limit the warp displacement or articulation of the legs in operation, it can be any shape to provide such a travel stop through physical interference and may be located under the beam members instead of above them as shown in FIGS. 6 to 8.

The positions of the hidden protrusions and the blind holes in FIGS. 6 to 8 can be swapped such that for example, the protrusion 8f on leg 8 can become a blind hole located in the end of beam portion 8a of leg 8 and the blind hole 7g of the adjacent leg 7 can become a protrusion located at the end of the beam portion 7a adjoining the actuating portion 7b.

It is not necessary to use obvious protrusions or tabs. One end of the beam portion of each leg can transfer force and position to the second end of the beam portion of the adjacent leg through any mechanism such as for example the underside of the first end of one beam member resting on the top of the second end of the beam member of the adjacent leg. This can be as simple as each beam portion being angled slightly from the horizontal so that each first end rests on the second end of the beam member of the adjacent leg. Each beam portion can preferably still be substantially horizontal in that case.

Figure 9:
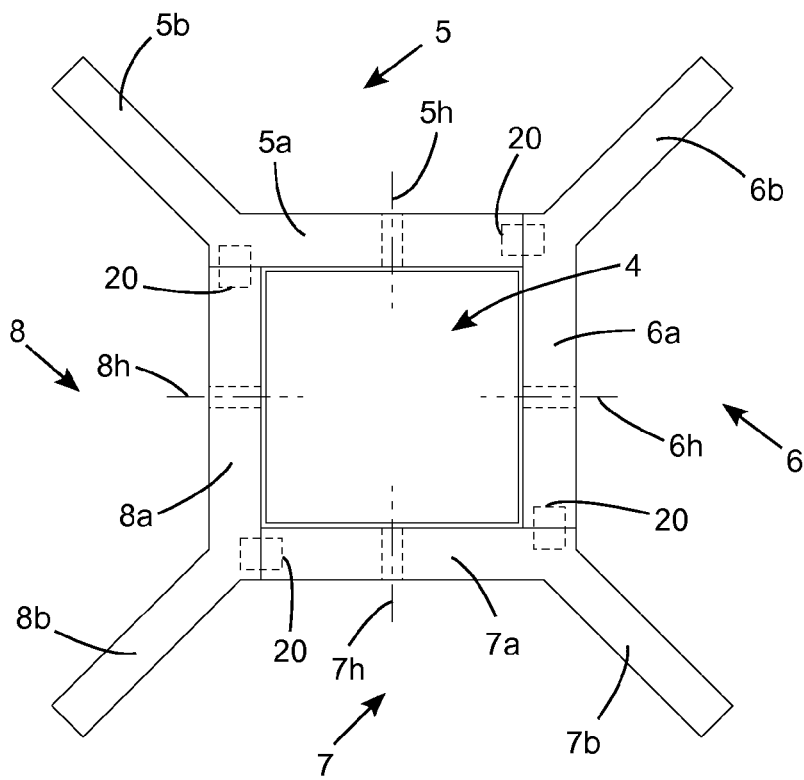
FIG. 9 is a simplified plan view of the mechanism from FIGS. 6 to 8.

FIGS. 9 to 18 are schematic drawings of alternate arrangements of at least a portion of the present invention. FIG. 9 shows the arrangement of FIGS. 1 to 8 in a schematic plan view, with rectangular blocks 20 shown in dashed lines representing the tabs (5d, 6d, 7d, 8d and/or 5e, 6e, 7e, 8e) from FIGS. 1 to 5 or the protrusions (5f, 6f, 7f, 8f) and slots (5g, 6g, 7g, 8g) from FIGS. 6 to 8. The rectangular blocks 20 can alternatively represent plates located in slots in both adjacent legs (like biscuit or plate joiners used in woodwork, but with the plates and slots sized and shaped to allow for angle changes between the legs) to transfer force and position therebetween. The rectangular blocks 20 can therefore represent a variety of connections between adjacent legs. Those connections 20 generally represent the area or engaging region on each leg that may used in forming such connections.

The base portion 4 in FIG. 9 is of the construction used in FIGS. 6 to 8, and locates the bolts 9 about which each leg pivots about its respective pivot axis 5h, 6h, 7h or 8h. Each leg can be considered as a lever part, for example the lever part or leg 5 in FIGS. 1 to 9 includes a beam portion 5a and an actuating portion 5b.

Figure 10:
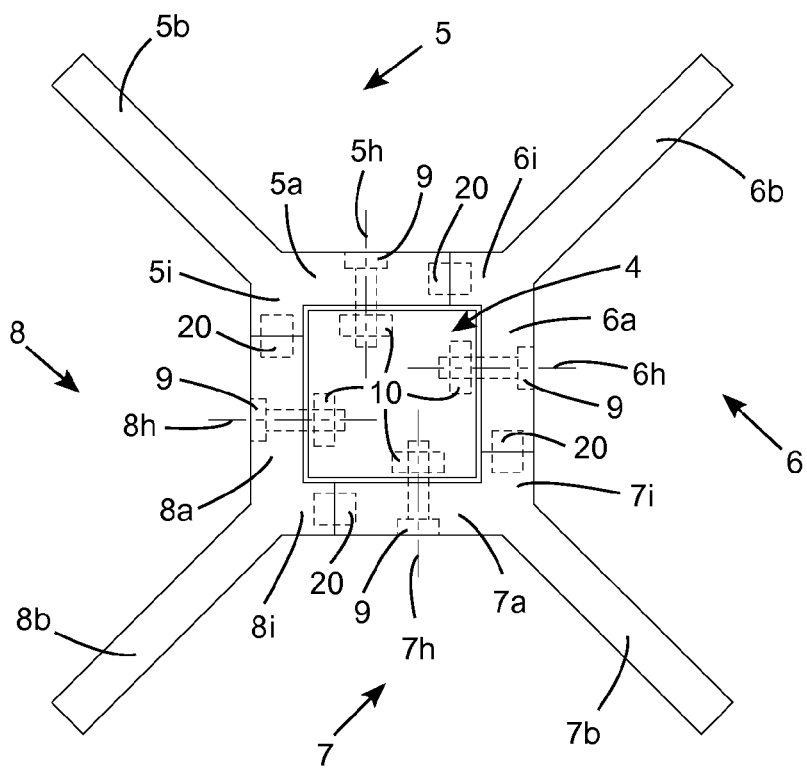
FIGS. 10 to 14 are simplified plan views of adaptations to the mechanism of FIGS. 6 to 9.
Figure 11:
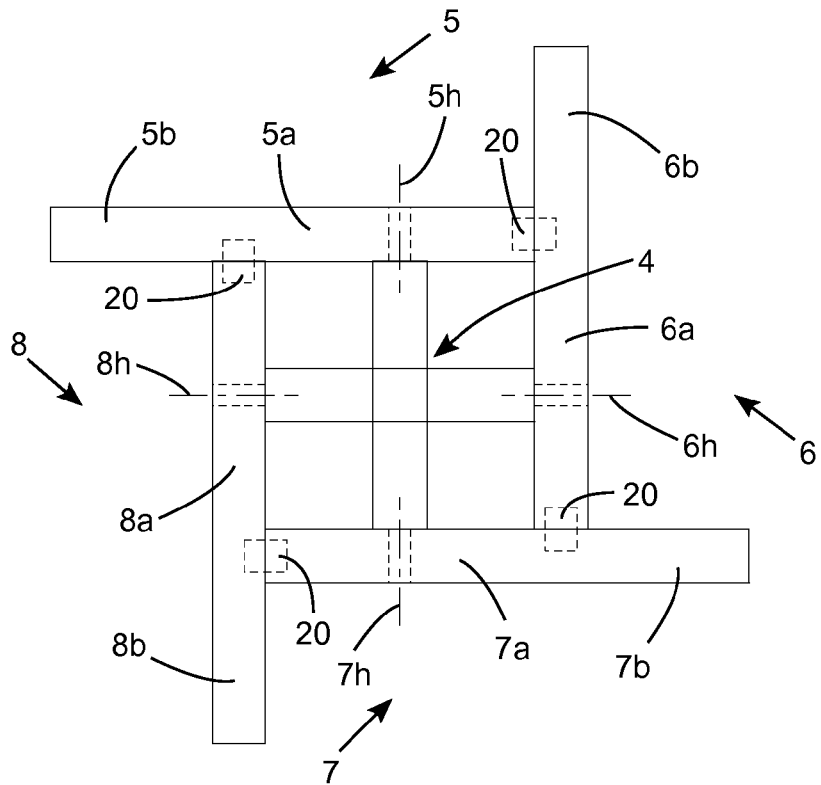
Figure 12:
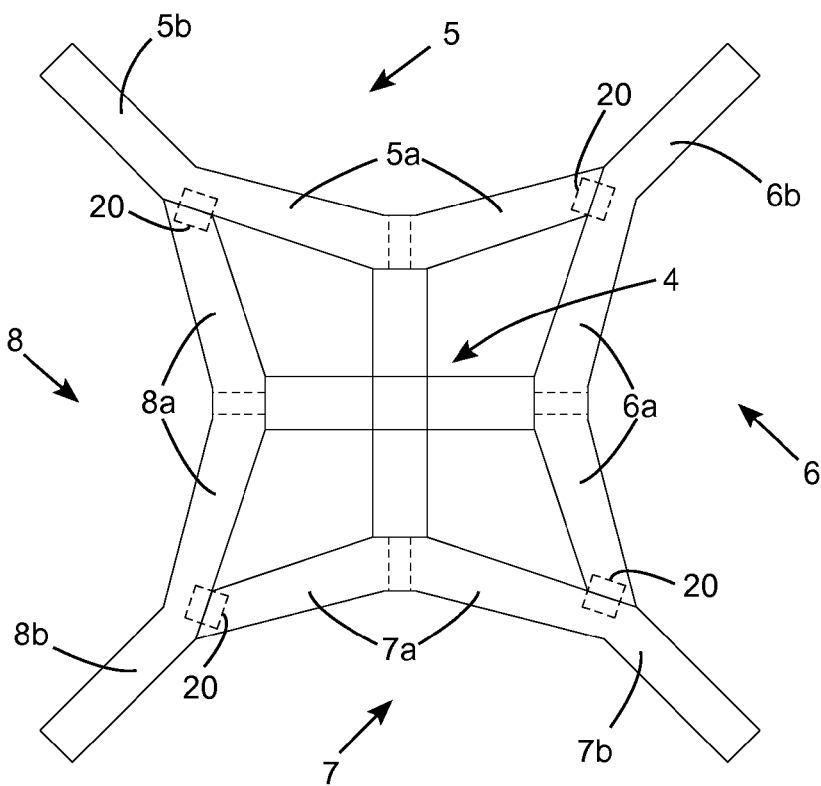

While the arrangement in FIG. 10 operates in a similar manner to that in the preceding Figures, each leg or lever part 5, 6, 7 or 8 does not however have four simple straight pivoting beam portions which each adjacent beam portion. At the end of the main beam portion (5a, 6a, 7a, or 8a) nearest the actuating portion (5b, 6b, 7b or 8b) is a short addition to the beam portion extending perpendicular to the main beam portion (5i, 6i, 7, or 8i). This creates an L-shaped beam portion from which each actuating portion extends. Each lever part is pivoted to the base, but the bolts 9 providing the pivot axes (5h, 6h, 7h or 8h) are not aligned as the connections (represented by the dashed blocks 20) between each lever part are not at the corners of the base 4, but partially along the sides of the base. Ideally, there is an equal distance between the pivot axis and each connection on a lever part, if the footprint of the arrangement is square. The offset between opposing bolt (pivot) axes in the arrangement shown in FIG. 10 allows the size of the base to be reduced by allowing more space between the locknuts 10 and any centrally located fixing to the base (for example a vertical bolt for a table stem).

The schematic arrangement in FIG. 11 is again very similar to the arrangements in FIGS. 1 to 9, but the lever parts or legs 5, 6, 7 and 8 are straight (ie the beam portion and actuating portion of each leg are aligned). The base 4 is similar to that shown in FIGS. 1 to 5 utilising a member to locate each pivot axis (5h, 6h, 7h or 8h), although the box design from FIGS. 6 to 9 is interchangeable. The operation of the arrangement is similar to that of previous arrangements. Although the lever parts are simple straight parts, the feet at the distal ends of the lever parts are not then located on a line through diagonally opposite corners of the base, so the base is not squarely aligned with the footprint of the feet which may be aesthetically undesirable.

The schematic arrangement in FIG. 12 is again very similar to the arrangements in FIGS. 1 to 9, but the lever parts have a more complex shape. The beam portion (5a, 6a, 7a or 8a) of each lever part is non-linear or boomerang-shaped in plan view which allows the connections 20 (i.e. the protrusions or tabs or other connections between the lever parts) to be further apart from each other and nearer the ground engaging means to reduce the load and increase the travel at each connection thereby reducing the amount of undesirable free movement of the mechanism caused by a given tolerance at the connection.

Figure 13:
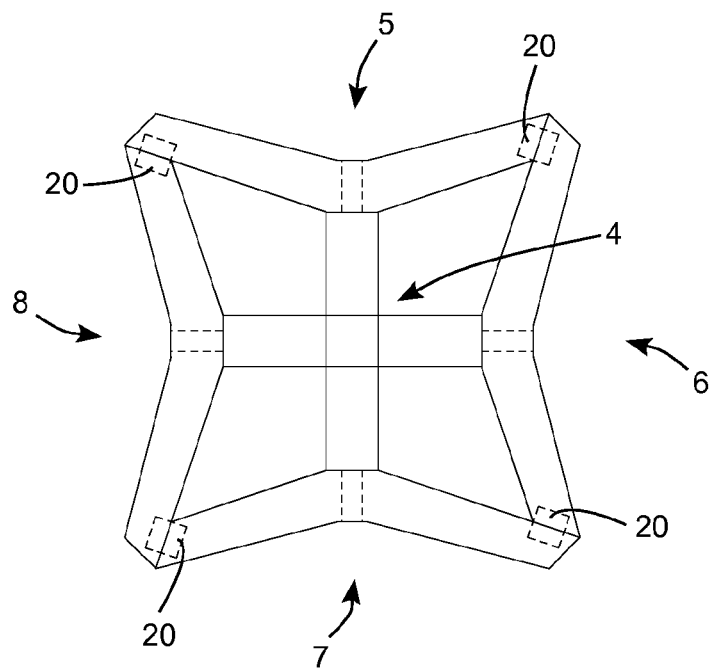

In FIG. 13, the actuating portion of each leg has been omitted. This arrangement is not particularly suitable for use in a table base as the mechanism would intrude on foot room or prevent a wide footprint. However, it can be used as a base under objects (such as white goods, coffee tables, work benches for example) where such foot room is not required or under a table top with legs extending downwards from the corners of the mechanism. The connections 20 (i.e. the protrusions or tabs or other connections between the lever parts) are now at or very close to the ground engaging means, allowing the connections to be as spaced apart from each other as possible.

Figure 14:
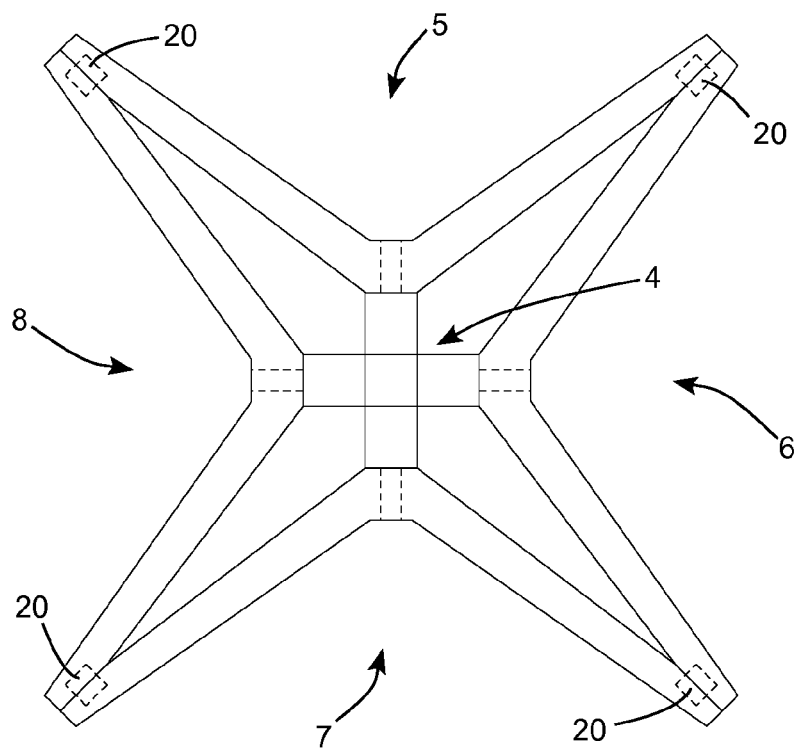

FIG. 14 the actuating portions of the legs have again been omitted, but the angled sections of the beam portion of each leg are at larger angles such that foot room can be provided. This enables the arrangement from FIG. 13 (where the connections 20 are at or very close to the ground engaging means) to be adapted for use under a table by providing foot room of a conventional amount as in the earlier Figures.

Alternatively, the long angled sections of each lever part 5, 6, 7 or 8 could be viewed as actuating portions in which case the ends of the actuating portions engage with each other instead of the ends of the beam portions.

Figure 15:
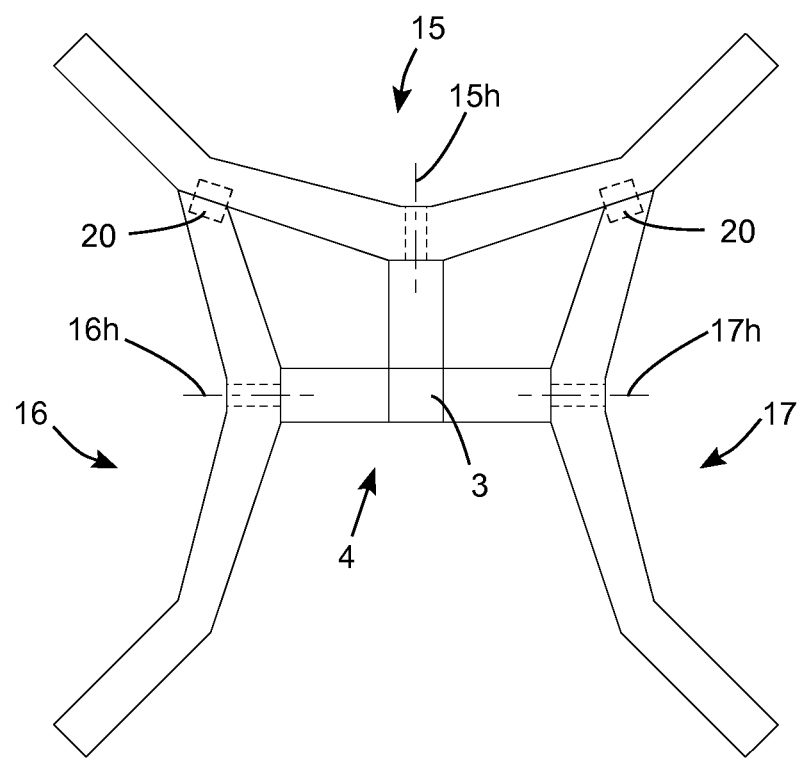
FIG. 15 is a simplified plan view of another possible embodiment of the present invention.
Figure 16:
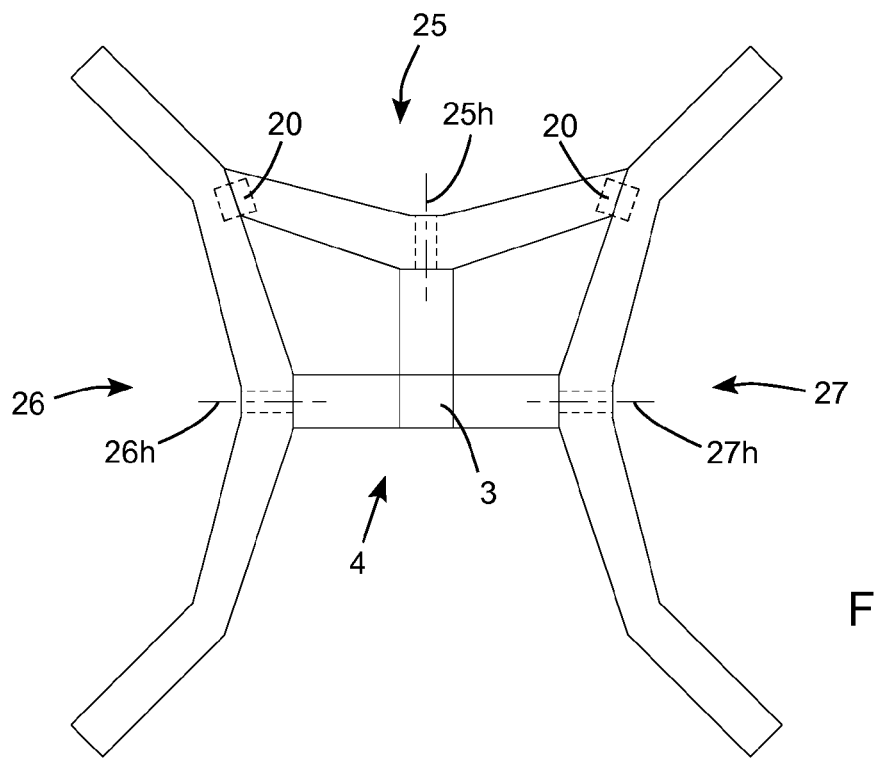
FIG. 16 is a simplified plan view of a further possible embodiment of the present invention.
Figure 17:
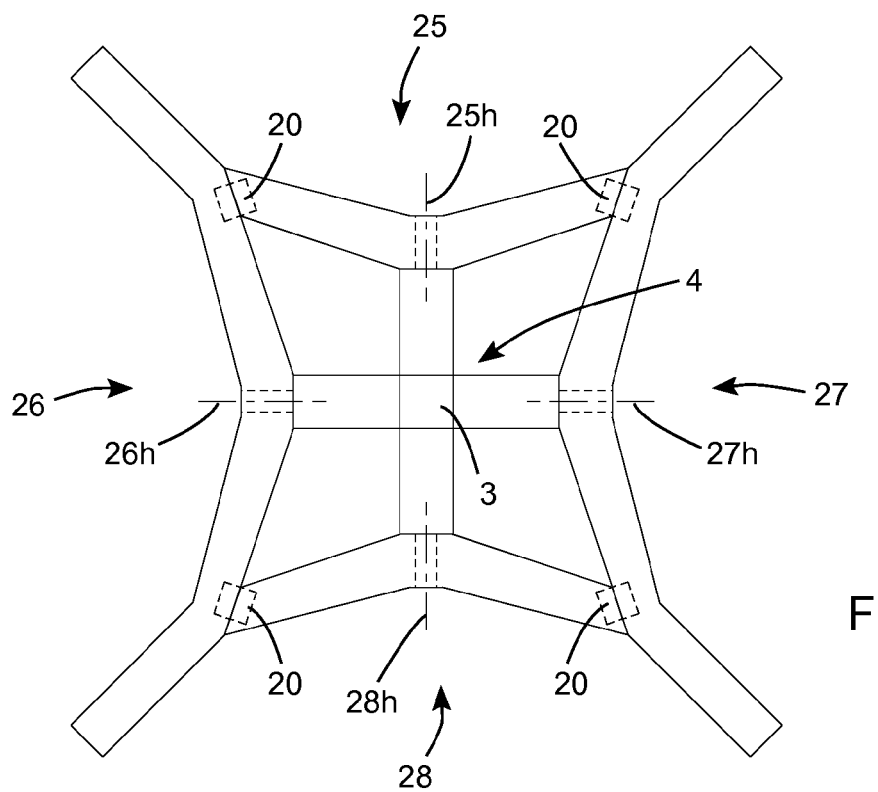
FIG. 17 shows a modification to the embodiment of FIG. 16.

The mechanisms shown in FIGS. 15 to 17 provide the same functionality of a free-warp support for an object above four feet. That is, four ground engaging means are connected to an interconnection means or base 4 in such a way that an object connected to the interconnection means can be supported above the four ground engaging means even when the ground is uneven and the ground engaging means do not lie in a common linear plane. However the mechanisms in FIGS. 15 and 16 utilise only three lever parts.

In FIG. 15, two of the lever parts 16 and 17 have a foot or other ground engaging means at one end and a connection (20) to the third lever part 15 at the opposite end. This makes each lever part different, whereas in the earlier figures, each lever part can be identical. However, the omission of the fourth lever part leaves one side of the base 4 open up to the stem 3, which can allow the bases to be stacked more closely than the earlier designs.

The operation of the mechanism in FIG. 15 is different to the earlier figures although the functionality is the same. In FIG. 15, either end of the lever part 15 is an actuating portion including respective ground engaging means. The beam portion of the lever part 15 is connected to the base such that it is free to rotate about pivot axis 15h. Each of the lever parts 16 and 17 is connected to the base such that they are free to rotate about their respective pivot axes 16h and 17h. Each have a connection 20 at one end and a ground engaging means at the other end. Unlike the lever parts in the previous figures, there is not a second connection between the pivot axis and the ground engaging end of the lever part (16 or 17). So for the lever parts 16 and 17, the force in each connection means reacts the moment about the pivot axis generated by any support force at the ground engaging means. This ensures that in use, the connections are always loaded in a common direction, i.e. the load does not reverse, removing the risk of an unstable zone in which there is free play. Those forces in the connection means 20 both act on the lever part 15 which provides the load distributing, free warp functionality, balancing the loads and displacements of its two ground engaging means and the respective ground engaging means of the lever parts 16 and 17. As with the mechanisms in the other figures, the lever parts inherently adjust or articulate to conform to both linear plane surfaces and warped (non-linear plane or uneven) surfaces as required to transfer the loads and support the object such as a table top connected via the interconnection means (the base 4 and stem 3).

The mechanism in FIG. 16 operates differently to the earlier figures including FIG. 15, but provides similar functionality. The lever parts 26 and 27 are symmetrical, each having two ground engaging means, one at either end. They are also each connected (towards the middle between the two ends) to the base 4, such that they can each rotate about a respective pivot axis 26h or 27h and on or in each lever part is a connection 20, located between one of the end ground engaging means and the pivot axis 26h or 27h. These two lever parts would provide support of an object connected to the lever parts by the interconnection means (such as the base 4 and stem 3), but not prevent it from falling by rotation of the base 4 about the pivot axes 26h and 27h. The lever part 25 is essentially a beam member with a connection at either end to transfer loads and displacements to the connections on the lever parts 26 and 27. The lever part is connected to the base 4 by a bolt or other fixing to allow rotation about the pivot axis 25h. The lever part 25 rotates about the axis 25h when the lever parts 26 and 27 rotate in opposite directions, which permits free warp. However, the connection of lever part 25 to pivot axis 25h locks or prevents rotation of the lever parts 26 and 27 in the same direction as each other. The connections 20 can be loaded in reversing directions in this mechanism, so the single tab connection style shown in FIG. 1 cannot be used, although pairs of (upper and lower) tabs can be used, as can the other forms of connection previously discussed.

The mechanism in FIG. 17 has a similar mode of operation to the mechanism in FIG. 16. The addition of a fourth lever part 28 (connected to the base by a pivot having pivot axis 28h) can limit how close together the mechanisms can be stacked. However, the lever part 28 has the same function as lever part 25, the two acting in parallel, so the connections 20 between the (supporting) lever parts 26 and 27 with feet and the (balancing) lever parts 25 and 28 can be single direction tabs despite the loads reversing. If single direction tabs are used, the tabs of lever part 25 will react rotation of the base 4 and stem 3 in one direction about the axes 26h and 27h, and the tabs of lever part 28 will react a similar rotation in the opposite direction.

Figure 18:
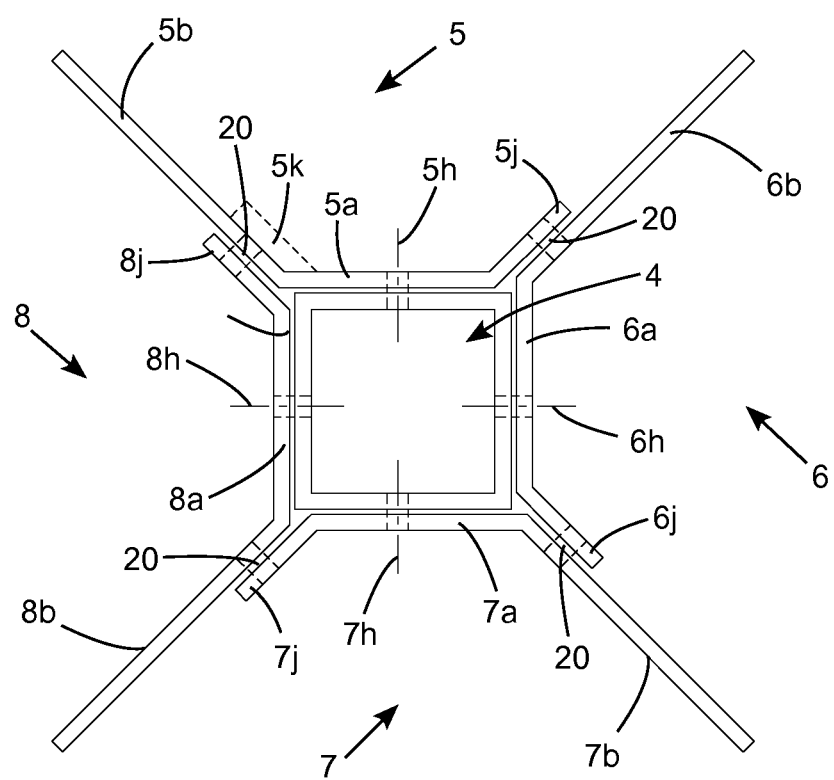
FIG. 18 shows a yet further possible embodiment of the present invention.

FIG. 18 is a simplified plan view of an embodiment of the invention that is suited to using different manufacturing techniques and thinner material than the previous embodiments. It can allow for example, the use of stamped and folded steel plate. The mechanism has fundamentally the same operation as the mechanism from FIGS. 6 to 14. For example, the connections 20 between lever parts 5, 6 and 8 provide a couple on lever part 5 to react the moment about the pivot axis 5h due to a support force acting at the ground engaging means end of the actuating portion 5b. The connections 20 are not at the point where beam portions such as 5a and 6a meet. Instead, at the opposite end of each beam portion (5a, 6a, 7a or 8a) to the actuating portion (5b, 6b, 7b or 8b) is an additional portion 5j, 6j, 7j or 8j extending parallel to the actuating portion (6b, 7b, 8b or 5b) of the adjacent lever part. In the schematic plan view of FIG. 18, each actuating portion extends on a line through the corners of the base 4 so that the ends of the actuating portions extend in line with the corners of a square object mounted to and in alignment with the base for a pleasing aesthetic. As a result the effective locating point of each connection 20 is offset from a line at a 45 degree angle to the base, which provides an offset of the pivot axis (5h, 6h, 7h or 8h) from the centre of each side of the base as shown. Again to improve the visual symmetry of the arrangement, a dummy piece of material can optionally be attached to the actuating portions of the lever parts (such as shown in dashed lines at 5k on actuating portion 5b). Such dummy pieces of material can be used for all lever parts and can be shaped to extend over the top of the connection 20 and the additional portion 8j of the adjoining lever part to provide a cover to prevent dirt falling into the joint and to prevent items being trapped between the actuating portions and the additional portions.

Figure 19:
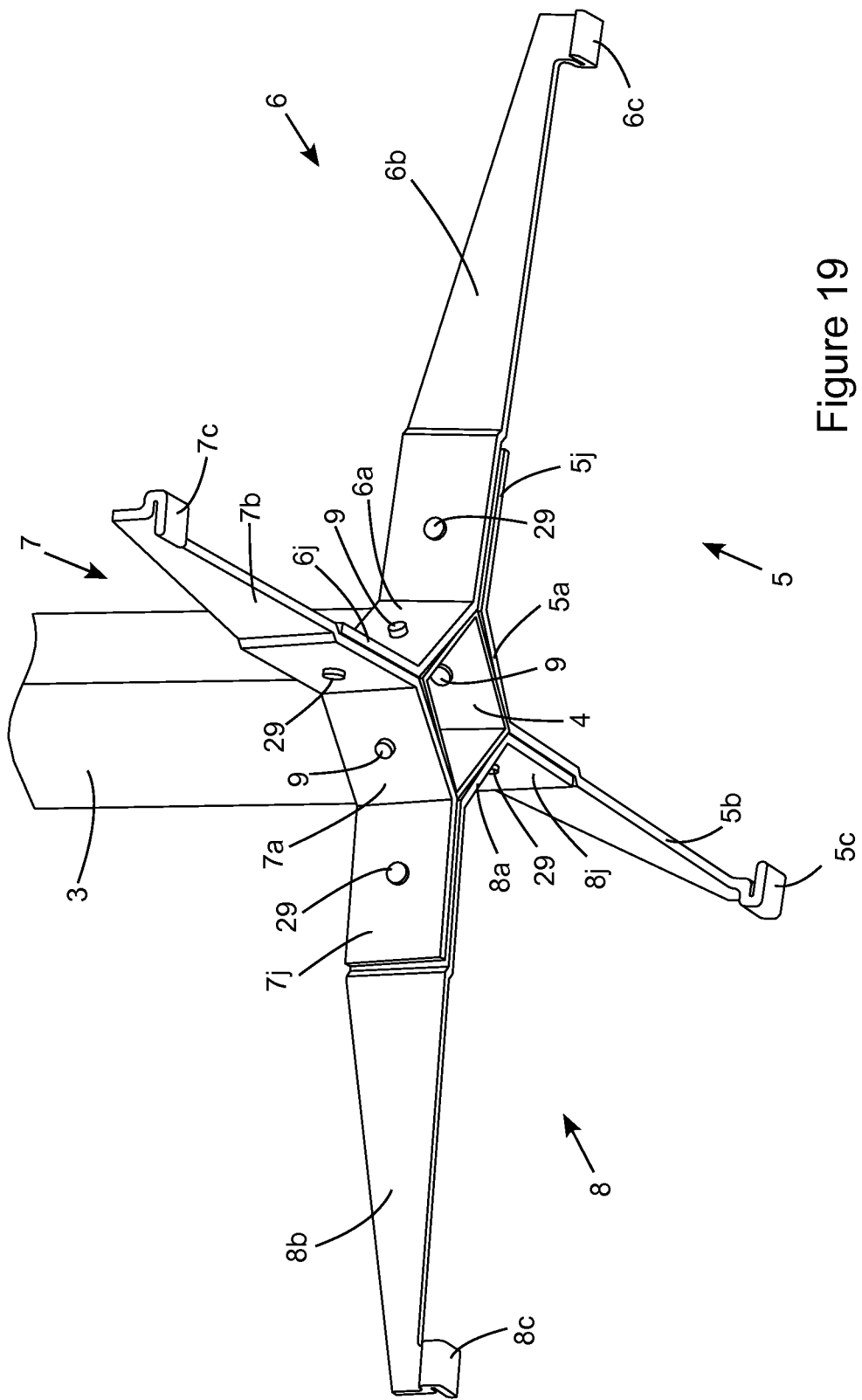
FIG. 19 is a perspective view of the embodiment shown in FIG. 18.

FIG. 19 is a perspective view of a modification to the mechanism of FIG. 18. The actuating portions of the lever parts include a double bend just past the end of the additional portion of the adjoining lever part so that the ends of the actuating portions are in line with the corners of the base. This provides a substantially symmetrical appearance, removing the need for a dummy piece of material and allowing the lever parts to be pivoted in the centre of each side of the base.

A bolt or rivet 29 is shown to connect each actuating portion (5b, 6b, 7b or 8b) with the additional portion (6j, 7j, 8j or 5j) of the adjoining lever part. This method of connection can provide sufficient location of the four lever parts relative to each other, that the bolts 9 providing the pivotal connections of the lever parts (5, 6, 7 and 8) to the base 4 can be replaced with simple stubs or pins that provide a pivot axis with no axial restriction, although bolts or rivets can still be used.

A tab at the end of each actuating portion is shown bent into a foot 5c, 6c, 7c or 8c. Also in FIG. 19 the mechanism is shown articulated, i.e. the feet 5c and 7c are raised from a level position and the feet 6c and 8c are lowered from a level position. While a top cover can be used as an articulation (or travel) limit for the mechanism as shown in FIG. 8, an alternative limiting mechanism can be used as shown in FIG. 20.

Figure 20:
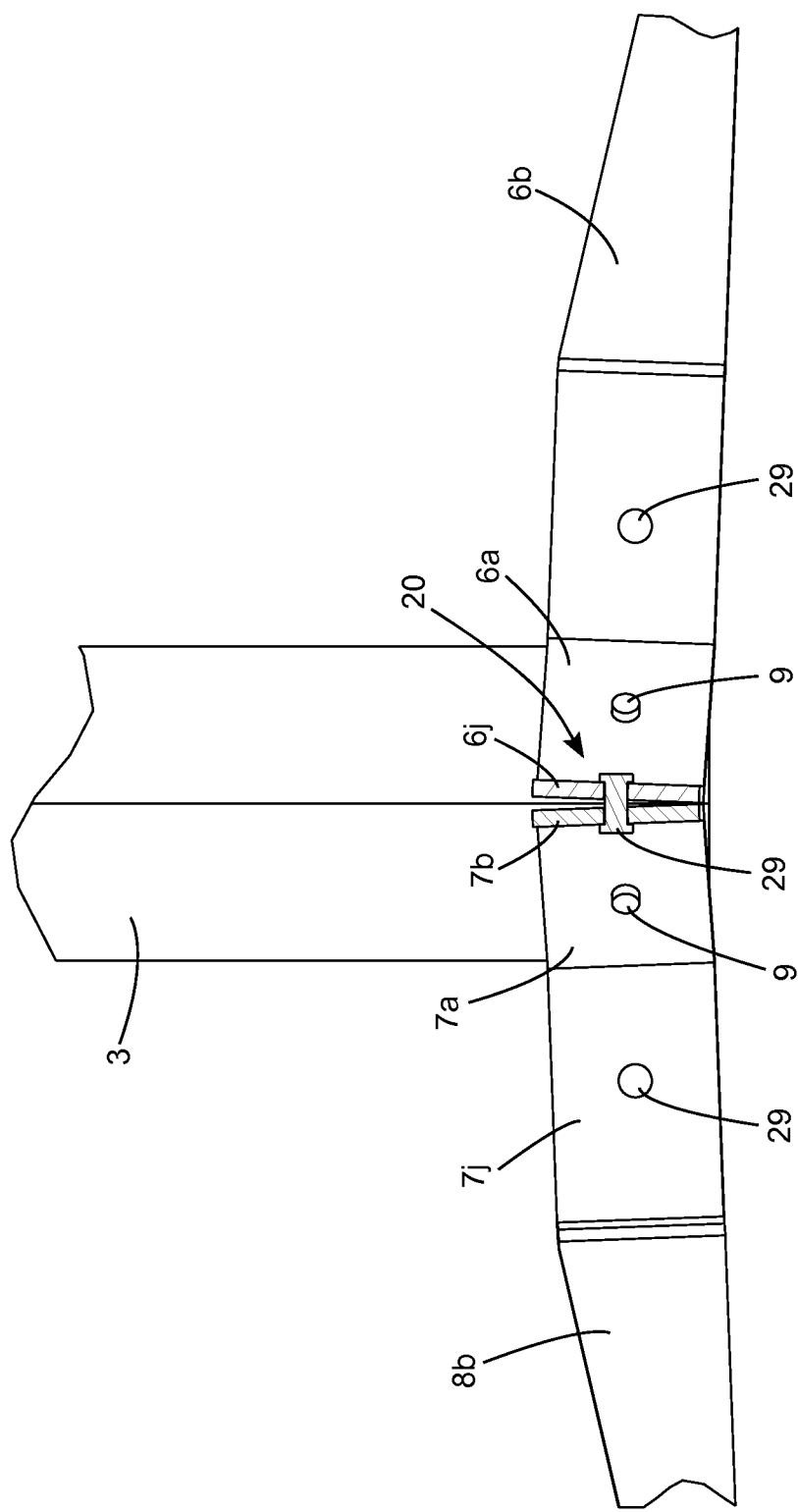
FIG. 20 shows a section through the embodiment of FIGS. 18 and 19.

FIG. 20 is a view from one corner of the mechanism (in line with actuating portion 5b), with a section cut through the connection 20. When the mechanism is in a level position (i.e. where all four ground engaging means lie in a linear plane), the actuating portion of each lever part is parallel to the additional portion 6j of the adjacent lever part. When the mechanism is articulated (in the same direction as in FIG. 19) as shown, the lever parts rotate about their pivot axes through bolts or rivets 9, causing a change of angle of the actuating portion 7b of one lever part and the additional portion 6j of the adjacent lever part until there is an interference between the two parts which provides a limit stop. The rivet 29 of the connection 20 can add stability of the lever parts in this situation.

Although only four legs are shown in the figures, it can be desirable to provide more legs in some applications, particularly larger tables, for example circular tables over 1.5 meters in diameter.

Figure 21:
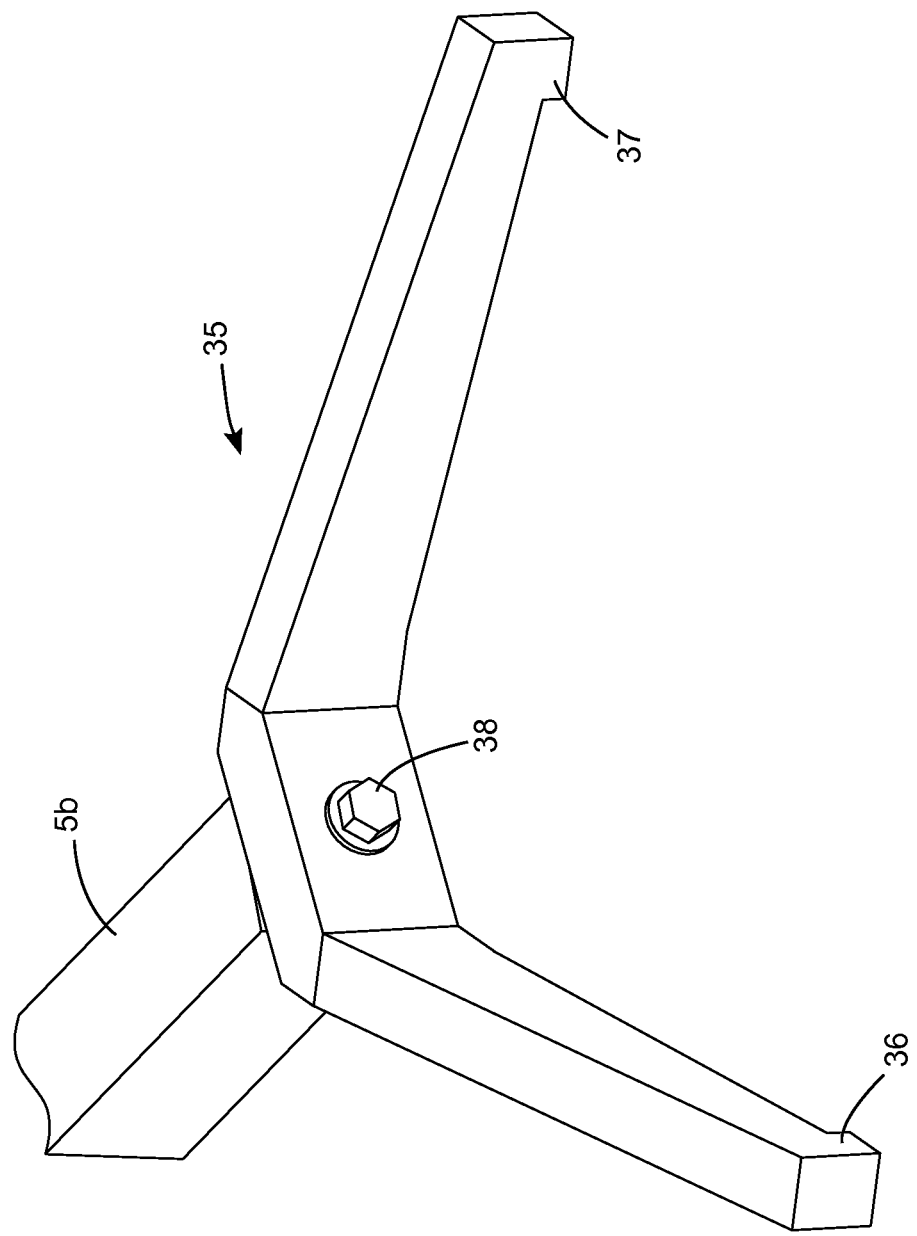
FIG. 21 is a partial view of the base showing a modification according to an alternative embodiment of the present invention.

The ground engaging means of a single foot at the end of an actuating portion of a lever part can be substituted for a pivotally mounted beam (or ground engaging portion) having a foot (or ground engaging point) at either end and a pivot in the middle. This form of ground engaging means is shown in FIG. 21, in which example, it is beam 35 with feet 36 and 37. The beam 35 is connected to the actuating portion 5b of a lever part by a bolt 38 or other rotating joint having a pivot axis. In use, the beam allows the load on the ground engaging means of a lever part to be distributed over two points of contact with the ground (ie over two feet), but the input to the lever part of the mechanism is effectively a single point which is on a line between the two feet, at an average height of the two feet and supporting the total load on the two feet. The use of such ground engaging means can allow the number of feet to be increased up to eight while still utilising the same mechanisms with four lever parts shown in the earlier figures. All feet can remain in contact with any irregularly contoured surface up to the limit of travel and ground clearance of the mechanism. The use of such ground engaging means at the ends of the lever parts 5, 6, 7 and 8 in FIG. 13 could allow that mechanism to be used for tables where foot room is required.

Alternatively, the mechanisms from the earlier figures can be adapted to any even number of legs greater than four. For example a six leg mechanism can be provided, in which case the beam portions of the legs may be arranged in a hexagonal layout. If all the feet do not lie in a common linear plane, then with the relative motions of the legs being defined by the mechanism, not all feet may touch the ground. However, the feet of at least four legs will always be in contact with the ground, with the additional legs providing supplementary support, similar to the well known use of five fixed legs on office chairs where generally only three are in contact with an uneven surface at any one time.

The beam portions of the legs are arranged in a polygon in plan view. In FIGS. 1-8 the beam portions form a square and for any four legged table they will form some form of quadrilateral. For example, for a rectangular table, the foot of each leg can be located under the middle of each side of the table top rather than the actuating portion extending to the corners. The shape of the quadrilateral formed by the beam portions can be distorted to suit the proportions of the rectangular table top i.e. the beam portions of the mechanism can be in the form of a rhombus.

The mechanism has been shown close to the ground. However, the base portion 4 (to which the beam portions of the legs are rotatably connected) can be located at any height up to under the table top 2. Then the actuating portions of the legs need to incorporate a substantially vertical portion extending down from the level of the base portion to the ground (or a foot to engage the ground). The lateral displacement of each foot for a given warp displacement of the mechanism is determined by the height of the pivot axis (along bolt 9) of the leg above the ground vs the length in plan view from the foot to the pivot axis of the leg. So the closer to ground the base portion is located, the less the lateral displacement of the foot, improving the ease of operation of the mechanism. Also the greater the length of the substantially vertical portion of the leg, the greater the angle change of the leg and corresponding aesthetically negative effect, although this can be countered by angling the substantially vertical portion of the leg further from vertical.

The base portion is shown as a cross-shaped structure in FIGS. 1 to 5 and as a square structure in FIGS. 6 to 8. However, it can take any form providing it locates the pivot axes of the legs as required by the operation of the mechanism. As discussed above, the beam portions of the four-legged versions of the mechanism can be arranged in any quadrilateral shape with other polygons formed when using different numbers of legs.

Although the mechanism described above is applied primarily to tables, it can be applied to the support of other objects including trolleys, workbenches, chairs, fridges and washing machines.

The invention claimed is:

1. A stabilising arrangement to support an object above four ground engaging means, the arrangement including an interconnection means interconnecting at least three lever parts including a first lever part, a second lever part and a third lever part, each of the lever parts includes a beam portion connected to the interconnection means by a respective pivot having a respective pivot axis, thereby providing respectively a first pivot axis, a second pivot axis and a third pivot axis, each ground engaging means being attached to or integral with one of said at least three lever parts where one of said four ground engaging means is connected to the first lever part, one other of said four ground engaging means is connected to the third lever part and at least one other of said four ground engaging means is connected to the second lever part, the interconnection means including a stem portion, the first pivot axis and the third pivot axis being at an angle of up to thirty degrees of parallel to each other, and within thirty degrees of perpendicular to the second pivot axis, the second lever part including first and second engaging regions, the first engaging region being located on the opposite side of the second pivot axis to the second engaging region in plan view, the first lever part including a first engaging region, in use engaged with the second engaging region of the second lever part, the third lever part including a second engaging region, in use engaged with the first engaging region of the second lever part, such that rotation of the first lever part drives a rotation of the second lever part which drives rotation of the third lever part in a substantially opposite direction to the first lever part to permit a warp displacement of the four ground engaging means, the stabilising arrangement thereby providing support of the object on uneven ground, and wherein the stabilising arrangement includes a travel limit limiting the rotation of each lever part about its pivot axis to thereby limit an articulation or warp displacement of the lever parts.

2. A stabilising arrangement according to claim 1, wherein the second lever part has two said ground engaging means.

3. A stabilising arrangement according to claim 2 wherein a cover extends over the beam portion of each lever part, the cover limiting the rotation of the lever part to a desired maximum deflection.

4. A stabilising arrangement according to claim 1 further including a fourth lever part connected to the interconnection means by a fourth pivot having a fourth pivot axis, the fourth pivot axis being within thirty degrees of perpendicular to the first and third pivot axes, the fourth lever part including first and second engaging regions, the first engaging region being located on the opposite side of the fourth pivot axis to the second engaging region in plan view, the first lever part including a second engaging region located on the opposite side of the first pivot axis to the first engaging region in plan view, the third lever part including a first engaging region located on the opposite side of the third pivot axis to the second engaging region in plan view, the first engaging region of the fourth lever part in use being engaged with the second engaging region of the first lever part, and the second engaging region of the fourth lever part in use being engaged with the first engaging region of the third lever part, and wherein the second and fourth lever parts each include a respective said ground engaging means, and the respective ground engaging means of each lever part being located on the opposite side of the respective pivot axis to the respective first engaging region, and wherein each said lever part includes the respective beam portion between the first and second engaging regions of the respective lever part.

5. A stabilising arrangement according to claim 4 wherein each lever part includes an actuating portion extending from the beam portion to the ground engaging means.

6. A stabilising arrangement according to claim 5 wherein each lever part further includes an additional portion extending parallel to the actuating portion of an adjacent lever part, one of the first or second engaging regions of each lever part being located on the actuating portion of the respective lever part and the other of the first or second engaging regions being located on the additional portion of the respective lever part.

7. A stabilising arrangement according to claim 6 wherein a cover extends over the beam portion of each lever part, the cover limiting the rotation of the lever part to a desired maximum deflection.

8. A stabilising arrangement according to claim 5 wherein a cover extends over the beam portion of each lever part, the cover limiting the rotation of the lever part to a desired maximum deflection.

9. A stabilising arrangement according to claim 6 wherein a respective bolt or rivet connects each actuating portion with the additional portion of the adjacent lever part.

10. A stabilising arrangement according to claim 9 wherein, when the mechanism is articulated, the lever parts rotate about their respective pivot axes causing a change of angle of the actuating portion of one lever part and the additional portion of the adjacent lever part until there is an interference between the two parts thereby providing the travel limit.

11. A stabilising arrangement according to claim 1 wherein at least one of said ground engaging means includes a ground engaging portion having at least two ground engaging points.

12. A stabilising arrangement according to claim 6 wherein, when the mechanism is articulated, the lever parts rotate about their respective pivot axes causing a change of angle of the actuating portion of one lever part and the additional portion of the adjacent lever part until there is an interference between the two parts thereby providing the travel limit.

13. A stabilising arrangement according to claim 1 wherein a cover extends over the beam portion of each lever part, the cover limiting the rotation of the lever part to a desired maximum deflection.

14. A stabilising arrangement according to claim 13 wherein the cover is a top cover extending over a top surface of the beam portion of each lever part.

15. A stabilising arrangement according to claim 13 wherein the cover is located under the beam portion of each lever part.

16. A stabilising arrangement according to claim 4 wherein a cover extends over the beam portion of each lever part, the cover limiting the rotation of the lever part to a desired maximum deflection.

17. A stabilising arrangement according to claim 4 wherein the four lever parts are arranged such that their beam portions form a quadrilateral shape in plan view.

18. A stabilising arrangement according to claim 17 wherein the interconnection means includes a substantially horizontal base portion providing location of the pivot axis of each lever part and the quadrilateral shape formed by the beam portions of the lever parts is a square or rectangle, the pivot axis of two opposite lever parts being aligned and the pivot axis of adjacent lever parts being perpendicular thereto, such that the base portion effectively provides two perpendicular, substantially horizontal axes.

19. A stabilising arrangement according to claim 18 wherein the base portion of the interconnection means is formed in the shape of a cross, square or rectangle in plan view.

20. A stabilising arrangement according to claim 1 wherein the base portion of the interconnection means is formed in the shape of a cross, square or rectangle in plan view.

21. A stabilising arrangement according to claim 1 wherein each lever part includes a beam portion major axis between the first and second ends of the beam portion, the pivot axis of each lever part being substantially horizontal and perpendicular to the beam portion major axis.

22. A stabilising arrangement according to claim 1 including six lever parts arranged such that their beam portions form a hexagonal shape in plan view.

23. A stabilising arrangement according to claim 1 wherein the stem portion of the interconnection means is connected directly or indirectly to the object to be supported.

24. A stabilising arrangement according to claim 23 wherein the object is a table top.

25. A stabilising arrangement according to claim 1 wherein the object is a table top.

26. A stabilising arrangement according to claim 1 wherein each said ground engaging means is connected to the respective beam portion by an actuating portion, each actuating portion forming part of the respective lever part.

27. A stabilising arrangement according to claim 26 wherein each actuating portion extends on a line through corners of the interconnection means.

28. A stabilising arrangement according to claim 26 wherein each ground engaging means is located on a line through diagonally opposite corners of the interconnection means.

29. A stabilising arrangement according to claim 11 wherein the ground engaging portion is articulated to the respective lever part to enable distribution of load between at least two ground engaging points of the ground engaging portion.

* * * * *